US011438190B2

(12) United States Patent
Nogami

(10) Patent No.: US 11,438,190 B2
(45) Date of Patent: Sep. 6, 2022

(54) REMOTE MANAGEMENT APPARATUS AND REMOTE MANAGEMENT SYSTEM

(71) Applicant: DAIKIN INDUSTRIES, LTD., Osaka (JP)

(72) Inventor: Daisuke Nogami, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 17/288,840

(22) PCT Filed: Oct. 25, 2019

(86) PCT No.: PCT/JP2019/042038
§ 371 (c)(1),
(2) Date: Apr. 26, 2021

(87) PCT Pub. No.: WO2020/090685
PCT Pub. Date: May 7, 2020

(65) Prior Publication Data

US 2022/0006663 A1 Jan. 6, 2022

(30) Foreign Application Priority Data

Oct. 31, 2018 (JP) ............................ JP2018-205891

(51) Int. Cl.
*H04L 12/28* (2006.01)

(52) U.S. Cl.
CPC ...... *H04L 12/2809* (2013.01); *H04L 12/2818* (2013.01); *H04L 12/2825* (2013.01); *H04L 2012/285* (2013.01)

(58) Field of Classification Search
CPC ............ H04L 12/2809; H04L 12/2818; H04L 12/2825; H04L 2012/285
USPC .......................................................... 709/223
See application file for complete search history.

(56) References Cited

U.S. PATENT DOCUMENTS 9,946,571 B1 * 4/2018 Brown .................. G06F 9/4893
10,206,170 B2 * 2/2019 Mathews .......... H04M 1/72412
10,289,079 B2 * 5/2019 Ambühl ................. G05B 15/02
10,474,213 B1 * 11/2019 Brown .................. G06F 1/3212
(Continued)

FOREIGN PATENT DOCUMENTS

JP 2004-184068 A 7/2004
JP 2008-217229 A 9/2008
(Continued)

OTHER PUBLICATIONS

Gupta, H, Vahid Dastjerdi, A, Ghosh, SK, Buyya, R. iFogSim: A toolkit for modeling and simulation of resource management techniques in the Internet of Things, Edge and Fog computing environments. Softw Pract Exper. 2017; 47: 1275-1296. (Year: 2017).*
(Continued)

*Primary Examiner* — Melvin H Pollack
(74) *Attorney, Agent, or Firm* — Global IP Counselors, LLP

(57) ABSTRACT

A remote management apparatus remotely manages one or more devices. After establishing communication with a communication device incorporated in or connected to each of the one or more devices via a network, the remote management apparatus identifies a model of each of the one or more devices based on information received from the communication device.

17 Claims, 6 Drawing Sheets

(56) References Cited

U.S. PATENT DOCUMENTS

| | | | | |
|---|---|---|---|---|
| 10,665,070 | B1 * | 5/2020 | Picardi | G08B 25/008 |
| 11,009,836 | B2 * | 5/2021 | Hoffmann | G05B 13/0265 |
| 11,055,797 | B1 * | 7/2021 | Carone | H04L 67/12 |
| 2004/0107024 | A1 | 6/2004 | Yoon et al. | |
| 2010/0083356 | A1 | 4/2010 | Steckley et al. | |
| 2013/0330088 | A1 | 12/2013 | Oshima et al. | |
| 2016/0215996 | A1 | 7/2016 | Blair et al. | |
| 2018/0102914 | A1 * | 4/2018 | Kawachi | G10L 15/22 |
| 2018/0285544 | A1 * | 10/2018 | Chang | G06V 40/172 |
| 2018/0316416 | A1 * | 11/2018 | Reis | H01Q 3/02 |
| 2018/0321951 | A1 * | 11/2018 | Fitzgerald | G06V 20/20 |
| 2018/0332434 | A1 * | 11/2018 | Kulkarni | H04L 43/10 |
| 2018/0341255 | A1 * | 11/2018 | Turney | G05B 23/0294 |
| 2018/0349242 | A1 * | 12/2018 | Mathews | H04W 12/50 |
| 2018/0356241 | A1 * | 12/2018 | Correnti | G01C 21/3647 |
| 2018/0373304 | A1 * | 12/2018 | Davis | G06F 1/3206 |
| 2019/0011283 | A1 * | 1/2019 | Soutar | H04L 67/22 |
| 2019/0020495 | A1 * | 1/2019 | Roosli | H04L 12/2809 |
| 2019/0081813 | A1 * | 3/2019 | Nistane | H04L 12/2816 |
| 2019/0130718 | A1 * | 5/2019 | Alpert | G08B 19/00 |
| 2019/0132931 | A1 * | 5/2019 | Sharma | H05B 47/165 |
| 2019/0197879 | A1 * | 6/2019 | Raji | G08B 25/008 |
| 2019/0212026 | A1 * | 7/2019 | Kim | F24F 11/62 |
| 2019/0349426 | A1 * | 11/2019 | Smith | H04W 4/08 |
| 2019/0356550 | A1 * | 11/2019 | Stanciu | H04L 41/12 |
| 2020/0050753 | A1 * | 2/2020 | Davis | G08C 17/02 |

FOREIGN PATENT DOCUMENTS

| | | | |
|---|---|---|---|
| JP | 2008-267765 | A | 11/2008 |
| JP | 2009-9414 | A | 1/2009 |
| JP | 2010-32160 | A | 2/2010 |
| JP | 2012-14431 | A | 1/2012 |
| JP | 2012-238972 | A | 12/2012 |
| JP | 2015-197230 | A | 11/2015 |
| JP | 2015-216667 | A | 12/2015 |

OTHER PUBLICATIONS

A. G. Ruzzelli, C. Nicolas, A. Schoofs and G. M. P. O'Hare, "Real-Time Recognition and Profiling of Appliances through a Single Electricity Sensor," 2010 7th Annual IEEE Communications Society Conference on Sensor, Mesh and Ad Hoc Communications and Networks (SECON), 2010, pp. 1-9. (Year: 2010).*

Moreno, Maria V., Miguel A. Zamora, and Antonio F. Skarmeta. "User-centric smart buildings for energy sustainable smart cities." Transactions on emerging telecommunications technologies 25.1 (2014): 41-55. (Year: 2014).*

Hyun Sang Cho, Minsoo Hahn, Takekazu Kato and Tatsuya Yamazaki, "Simple and robust method for detecting the electrical appliances using markers and programmable logic devices," 2009 IEEE 13th International Symposium on Consumer Electronics, 2009, pp. 334-338, doi: 10.1109/ISCE.2009.5156906. (Year: 2009).*

M. C. Bozchalui, S. A. Hashmi, H. Hassen, C. A. Canizares and K. Bhattacharya, "Optimal Operation of Residential Energy Hubs in Smart Grids," in IEEE Transactions on Smart Grid, vol. 3, No. 4, pp. 1755-1766, Dec. 2012, doi: 10.1109/TSG.2012.2212032.' (Year: 2012).*

Bregman, David, and Arik Korman. "A universal implementation model for the smart home." International Journal of Smart Home 3.3 (2009): 15-30. (Year: 2009).*

Xie Li and Wenjun Zhang, "The design and implementation of home network system using OSGi compliant middleware," in IEEE Transactions on Consumer Electronics, vol. 50, No. 2, pp. 528-534, May 2004, doi: 10.1109/TCE.2004.1309419. (Year: 2004).*

European Search Report of corresponding EP Application No. 19 88 0887.5 dated Dec. 2, 2021.

International Preliminary Report of corresponding PCT Application No. PCT/JP2019/042038 dated May 14, 2021.

International Search Report of corresponding PCT Application No. PCT/JP2019/042038 dated Jan. 14, 2020.

* cited by examiner

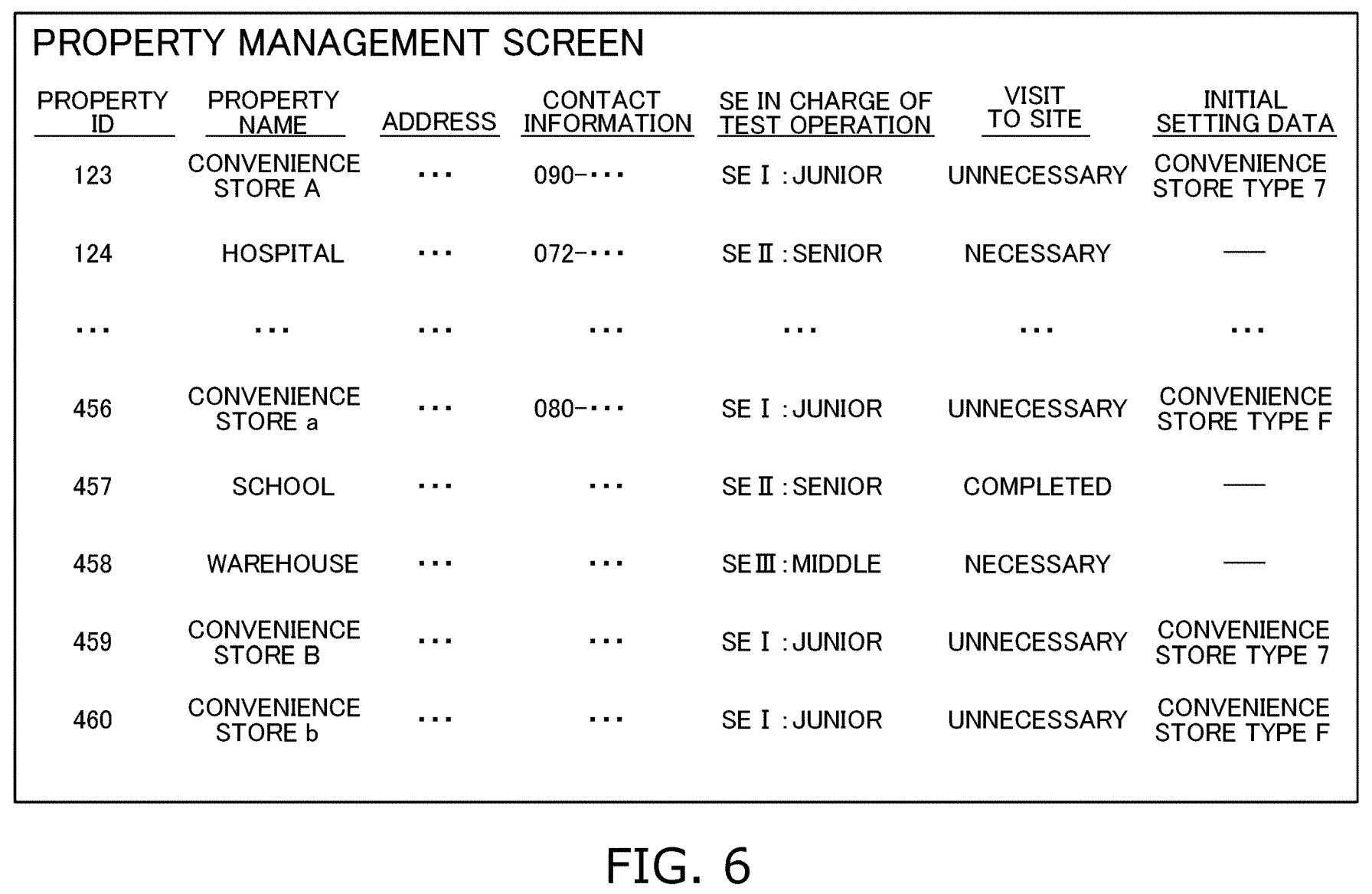

PROPERTY MANAGEMENT SCREEN

| PROPERTY ID | PROPERTY NAME | ADDRESS | CONTACT INFORMATION | SE IN CHARGE OF TEST OPERATION | VISIT TO SITE | INITIAL SETTING DATA |
|---|---|---|---|---|---|---|
| 123 | CONVENIENCE STORE A | ··· | 090-··· | SE Ⅰ : JUNIOR | UNNECESSARY | CONVENIENCE STORE TYPE 7 |
| 124 | HOSPITAL | ··· | 072-··· | SE Ⅱ : SENIOR | NECESSARY | — |
| ··· | ··· | ··· | ··· | ··· | ··· | ··· |
| 456 | CONVENIENCE STORE a | ··· | 080-··· | SE Ⅰ : JUNIOR | UNNECESSARY | CONVENIENCE STORE TYPE F |
| 457 | SCHOOL | ··· | ··· | SE Ⅱ : SENIOR | COMPLETED | — |
| 458 | WAREHOUSE | ··· | ··· | SE Ⅲ : MIDDLE | NECESSARY | — |
| 459 | CONVENIENCE STORE B | ··· | ··· | SE Ⅰ : JUNIOR | UNNECESSARY | CONVENIENCE STORE TYPE 7 |
| 460 | CONVENIENCE STORE b | ··· | ··· | SE Ⅰ : JUNIOR | UNNECESSARY | CONVENIENCE STORE TYPE F |

FIG. 6

REMOTE MANAGEMENT APPARATUS AND REMOTE MANAGEMENT SYSTEM

CROSS-REFERENCE TO RELATED APPLICATIONS

This U.S. National stage application claims priority under 35 U.S.C. § 119(a) to Japanese Patent Application No. 2018-205891, filed in Japan on Oct. 31, 2018, the entire contents of which are hereby incorporated herein by reference.

BACKGROUND TECHNICAL FIELD

Field of the Invention

A remote management apparatus and a remote management system for remotely managing one or more devices

Background Art Background Information

As disclosed in (Japanese Unexamined Patent Application Publication No. 2004-1840681, a system of the related art is known in which setting information for the operation of devices installed in customers' properties can be registered at a remote location via a network.

SUMMARY

When the initial setting of devices, which is performed when the devices are installed in customers' properties, is performed manually by a person in charge visiting each property, there is a problem in that man-hours required for the person in charge increase.

A remote management apparatus according to a first aspect remotely manages one or more devices. After establishing communication with a communication device to be incorporated in or connected to each of the one or more devices via a network, the remote management apparatus identifies a model of each of the one or more devices based on information received from the communication device.

A remote management apparatus according to a second aspect is the remote management apparatus according to the first aspect, and transmits, based on an identification result of the model of each of the one or more devices, initial setting information of each of the one or more devices to each of the one or more devices via the communication device.

A remote management apparatus according to a third aspect is the remote management apparatus according to the second aspect, in which the initial setting information includes at least one of identification information of the device, information concerning an installation location of the device, and information specific to an environment in which the device is to be installed.

A remote management apparatus according to a fourth aspect is the remote management apparatus according to any one of the first to third aspects, and further identifies, based on information received from the communication device, a property in which the device is to be installed.

A remote management apparatus according to a fifth aspect is the remote management apparatus according to the fourth aspect, and determines, based on an identification result of the property, whether to transmit initial setting information of each of the one or more devices to each of the one or more devices via the communication device.

A remote management apparatus according to a sixth aspect is the remote management apparatus according to any one of the first to fifth aspects, in which each of the one or more devices includes at least one of an air conditioner, a ventilator, and a refrigerator.

A remote management system according to a seventh aspect remotely manages one or more devices. The remote management system includes a control terminal to be connected to the one or more devices, and a management apparatus to be connected to the control terminal via a network. After establishing communication with the control terminal, the management apparatus identifies, based on information received from the control terminal, a property in which the device is to be installed. The control terminal identifies a model of the one or more devices based on information received from the one or more devices.

A remote management system according to an eighth aspect is the remote management system according to the seventh aspect, in which the management apparatus transmits, based on an identification result of the model of the one or more devices obtained by the control terminal, initial setting information of the one or more devices to the control terminal or the one or more devices.

A remote management system according to a ninth aspect is the remote management system according to the seventh aspect, in which the management apparatus determines, based on an identification result of the property, whether to transmit initial setting information of the one or more devices to the control terminal or the one or more devices.

A remote management system according to a tenth aspect is the remote management system according to the eighth or ninth aspect, in which the initial setting information includes at least one of identification information of the device, information concerning an installation location of the device, and information specific to an environment in which the device is to be installed.

A remote management system according to an eleventh aspect is the remote management system according to any one of the seventh to tenth aspects, in which each of the one or more devices includes at least one of an air conditioner, a ventilator, and a refrigerator.

A remote management system according to a twelfth aspect is the remote management system according to any one of the seventh to eleventh aspects, in which the management apparatus transmits operation setting information of the one or more devices to the control terminal or the one or more devices. The operation setting information includes at least one of information concerning a schedule of operating the device, information concerning permission and prohibition of operation of the device, and a parameter related to operation of the device.

A remote management system according to a thirteenth aspect is the remote management system according to any one of the seventh to twelfth aspects, in which the management apparatus presents, for each property, at least information concerning whether a person in charge needs to visit the property.

BRIEF DESCRIPTION OF DRAWINGS

FIG. 6 illustrates an example of property management information displayed on a display of a management apparatus 40 according to modification G.

DETAILED DESCRIPTION OF EMBODIMENT(S)

First Embodiment (1) Configuration

Figure 1:
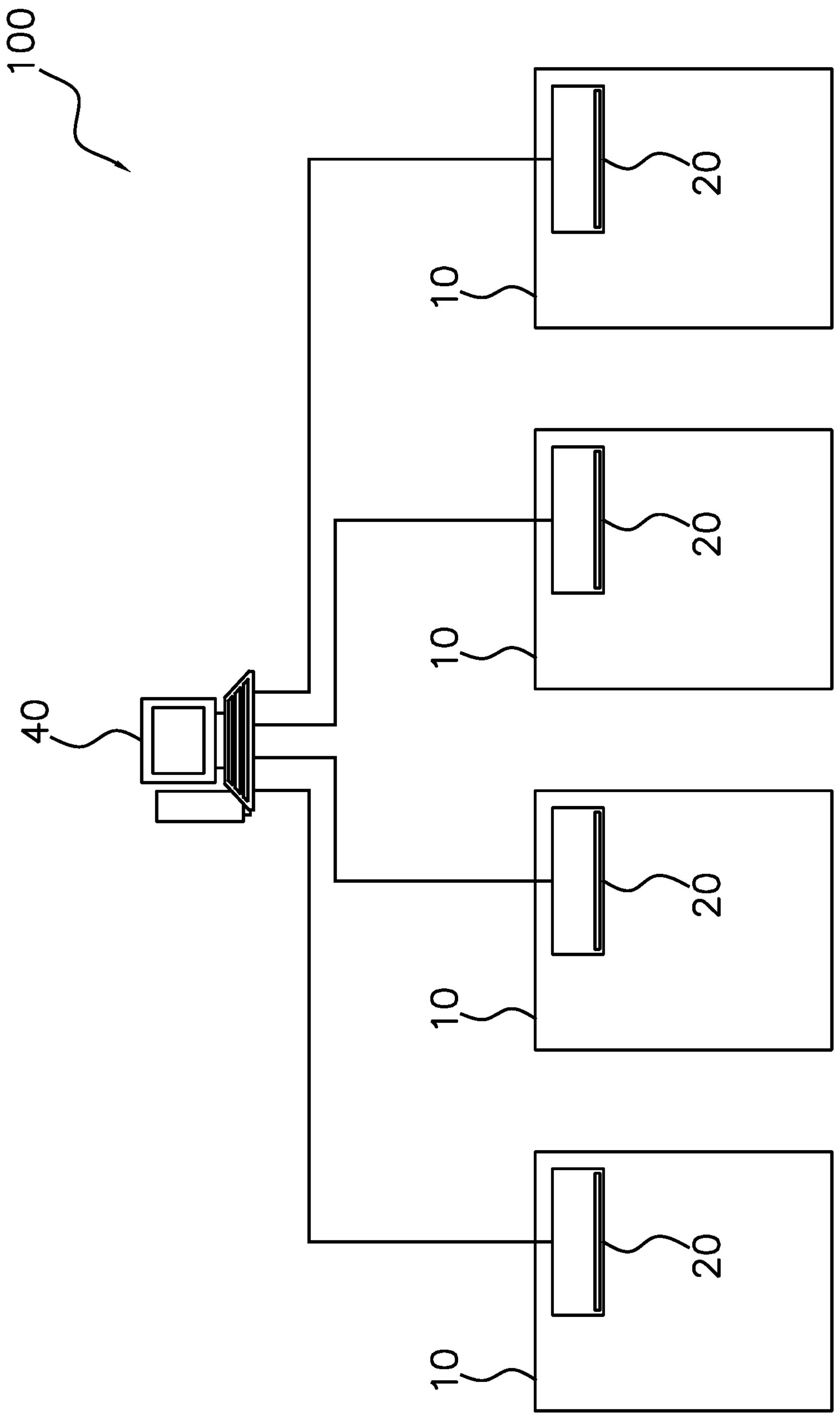
FIG. 1 is a conceptual diagram of an air conditioning control system 100 according to a first embodiment.

A remote management system 100 according to a first embodiment will be described with reference to the drawings. FIG. 1 is an overall configuration diagram of the remote management system 100. The remote management system 100 is a system for remotely managing a device 20 installed in a property 10 by using a management apparatus 40. As illustrated in FIG. 1, in a case where the remote management system 100 manages devices 20 installed in a plurality of properties 10, the management apparatus 40 manages the devices 20 in units of properties 10.

Figure 2:
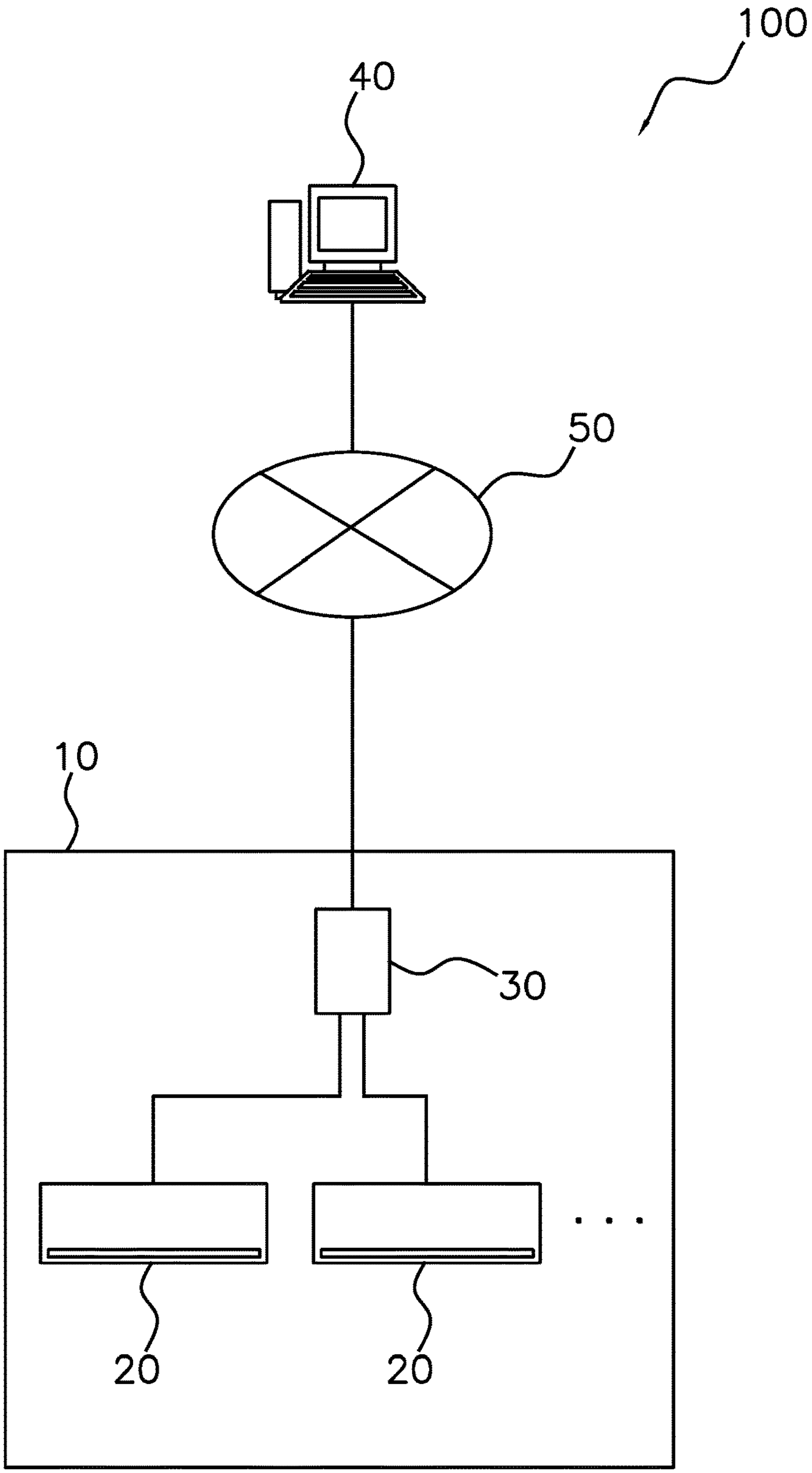
FIG. 2 is a detailed configuration diagram of the remote management system 100 according to the first embodiment.

The following describes a case where the remote management system 100 manages devices 20 installed in a certain property 10. FIG. 2 is a detailed configuration diagram of the remote management system 100. FIG. 2 illustrates only one property 10 in which a plurality of devices 20 are installed. As illustrated in FIG. 2, the remote management system 100 mainly includes the devices 20, a control terminal 30, the management apparatus 40, and a network 50. The devices 20 and the control terminal 30 are installed in the property 10. The management apparatus 40 is installed outside the property 10. The management apparatus 40 is an apparatus for remotely managing the devices 20 via the control terminal 30.

In each property 10, the devices 20 and the control terminal 30 are capable of communicating with each other via lines or the like installed in the property 10. The management apparatus 40 and the control terminal 30 in each property 10 are capable of communicating with each other via the network 50. However, the management apparatus 40 and the devices 20 in each property 10 are incapable of directly communicating with each other.

The property 10 is relatively small and operated uniformly. The property 10 is, for example, a franchise store such as a convenience store. In a case where the remote management system 100 manages a plurality of properties 10, the properties 10 are often the same or substantially the same in size, layout, the number of devices 20 installed, the installation positions of the devices 20, and so on.

Next, the components of the remote management system 100 will be described.

(1-1) Device

In this embodiment, each of the devices 20 is an air conditioner. In this case, the device 20 mainly includes one outdoor unit, a plurality of (for example, two to four) indoor units, and refrigerant pipes that connect the outdoor unit and the indoor units to each other. The indoor units are installed in a space to be air conditioned in the property 10. When the property 10 has only one space to be air conditioned, the number of indoor units installed in the space to be air conditioned and the installation locations of the indoor units are often the same or substantially the same among the plurality of properties 10.

(1-2) Control Terminal

The control terminal 30 is connected to each of the devices 20 via a line or the like installed in the property 10. The control terminal 30 is connected to the management apparatus 40 via the network 50. The control terminal 30 transmits, to each of the devices 20 installed in the property 10, information concerning the settings of the device 20. The device 20 operates based on the information concerning the settings of the device 20, which is received from the control terminal 30. The control terminal 30 has a function of identifying the model of the device 20 on the basis of information received from the device 20.

(1-3) Management Apparatus

The management apparatus 40 is installed in a management center or the like outside the property 10. The management apparatus 40 has a function of identifying the property 10 in which the devices 20 are installed, on the basis of the information received from the control terminal 30 via the network 50.

(1-4) Network

The network 50 connects the control terminal 30 installed in the property 10 and the management apparatus 40 installed outside the property 10 to each other. The network 50 is, for example, the Internet.

(2) Operation

The remote management system 100 can automatically complete the test operation of the control terminal 30, which is performed after the devices 20 and the control terminal 30 are installed in the property 10, without causing a person in charge to visit the property 10. The person in charge is, for example, a system engineer belonging to the manufacturer of the devices 20 and the control terminal 30. In the test operation of the control terminal 30, the control terminal 30 receives initial setting information of the devices 20 from the management apparatus 40. After that, the control terminal 30 performs initial setting of the devices 20 to allow the devices 20 to communicate with the control terminal 30 on the basis of the received initial setting information. In the test operation of the control terminal 30, initial setting of all the devices 20 connected to the control terminal 30 is performed.

The initial setting information includes, for example, at least one of identification information of the devices 20, information concerning the installation locations of the devices 20, and information specific to environments in which the devices 20 are installed. The identification information of the devices 20 is IDs for uniquely identifying the devices 20 and includes, for example, addresses assigned to the devices 20 installed in the property 10. The information concerning the installation locations of the devices 20 is, for example, information concerning the property 10 in which the devices 20 are installed, and includes, for example, the name, address, and contact information such as the telephone number of the property 10. The information specific to the environments in which the devices 20 are installed is, for example, information concerning the lengths of the refrigerant pipes of the devices 20, the height difference between the refrigerant pipes, and the like. The initial setting information may further include, as necessary, the names of the devices 20, the default value of the set temperature of the space to be air conditioned in the property 10, and so on.

Figure 3:
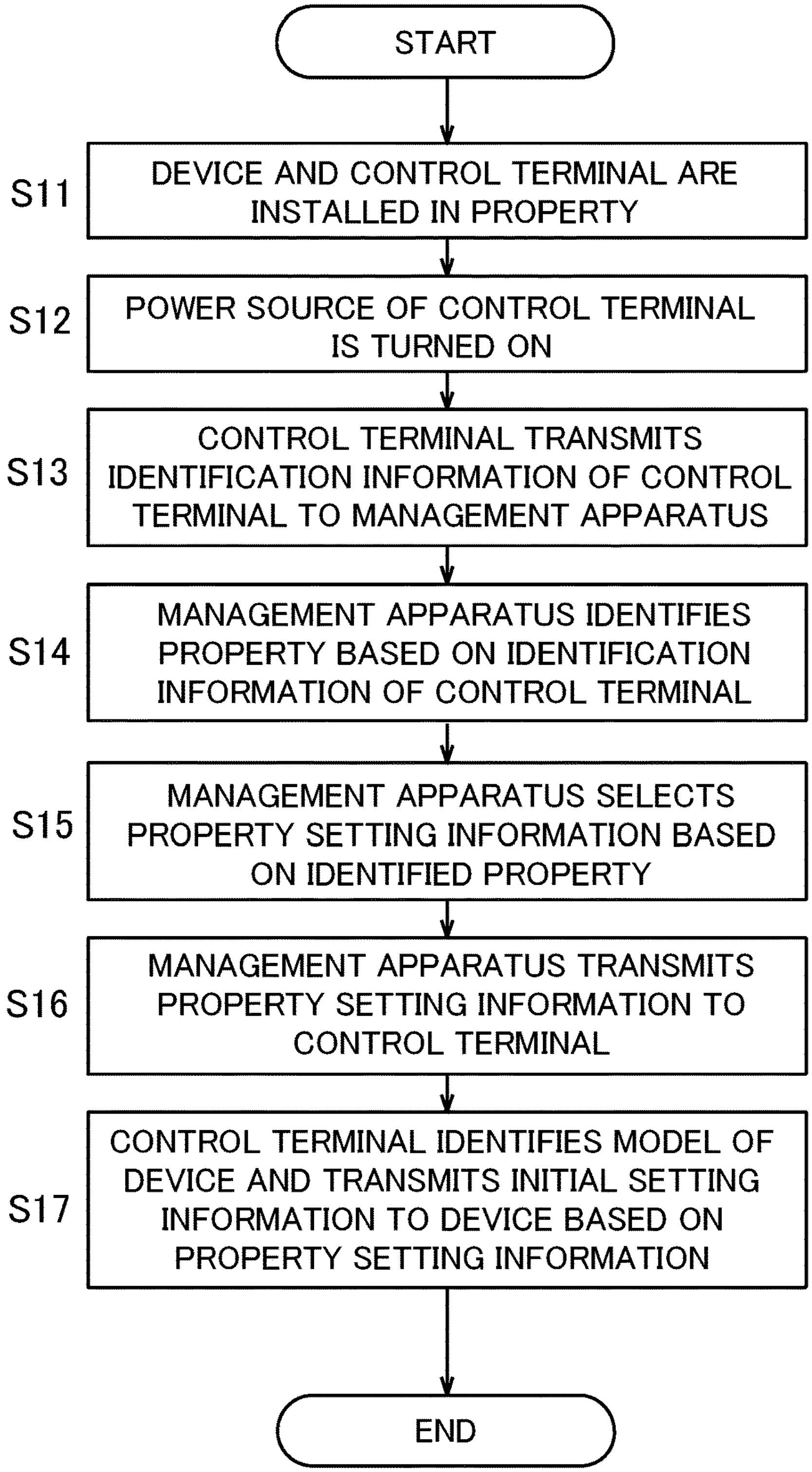
FIG. 3 is a flowchart of a test operation of a control terminal 30 according to the first embodiment.

Next, the details of the test operation of the control terminal 30, which is performed after the installation of the devices 20 and the control terminal 30, will be described. FIG. 3 is a flowchart of the test operation of the control terminal 30.

First, in step S11, the devices 20 and the control terminal 30 are installed in the property 10. The control terminal 30 is installed in the property 10 at the time or after the installation of the devices 20. At this time, wiring work for connecting the devices 20 and the control terminal 30 to each other is also performed. In step S11, only physical installation work of hardware is performed, and no software setting is performed.

Then, in step S12, the power source of the control terminal 30 is turned on. Specifically, a person who has installed the devices 20 and the control terminal 30 turns on the power source of the control terminal 30 after the completion of the installation work. When this operation is performed, all subsequent steps S13 to S17 are automatically executed, and the test operation of the control terminal 30 is completed.

In step S13, the control terminal 30 whose power source is turned on in step S12 requests the management apparatus 40 to transmit appropriate initial setting information. At this time, after establishing communication with the management apparatus 40, the control terminal 30 transmits identification information of the control terminal 30 to the management apparatus 40. The identification information of the control terminal 30 is a specific ID held by the control terminal 30 and is information for uniquely identifying the control terminal 30 installed in each property 10.

In step S14, the management apparatus 40 identifies the property 10 on the basis of the identification information of the control terminal 30 received from the control terminal 30 in step S13. The management apparatus 40 stores, in advance, information in which identification information of a control terminal 30 installed in each property 10 and the property 10 in which the control terminal 30 is installed are associated with each other. This enables the management apparatus 40 to identify the property 10 in which the control terminal 30 is installed, on the basis of the identification information of the control terminal 30.

In step S15, the management apparatus 40 selects property setting information on the basis of the property 10 identified in step S14. The property setting information is information necessary to execute the test operation of the control terminal 30. When a plurality of devices 20 are installed in the property 10, the property setting information includes initial setting information of each of the devices 20. The property setting information includes initial setting information of the devices 20 corresponding to the type of the property 10. For example, when the property 10 is a franchise store, there may be a plurality of types of properties 10 in the size and layout of the store, the number of devices 20 installed, the installation locations of the devices 20, and so on. Different types of properties 10 are typically different in the number of devices 20 installed, the installation locations of the devices 20, and so on. As a result, the property setting information to be used for the test operation of the control terminal 30 is also different. The management apparatus 40 stores, for each type of property 10, property setting information in advance.

In step S16, the management apparatus 40 transmits the property setting information selected in step S15 to the control terminal 30.

In step S17, the control terminal 30 transmits, to each of the devices 20 connected to the control terminal 30, initial setting information of the device 20 on the basis of the property setting information received from the management apparatus 40 in step S16. Specifically, the control terminal 30 identifies the model of each of the devices 20 on the basis of the information received from the device 20. The control terminal 30 identifies each of the devices 20 on the basis of the identified model of the device 20 and transmits appropriate initial setting information to the device 20. After that, initial setting of the device 20 is performed in accordance with the initial setting information received from the control terminal 30.

(3) Features

An existing test operation of control devices for devices installed in a plurality of customers' properties requires a person in charge to visit each of the customers' properties and perform the test operation of the control device. In this case, the person in charge needs to manually register information concerning the initial setting of the devices to the control device to perform the test operation of the control device. However, there is a problem in that the time and man-hours are required to adjust the date and time of the visit of the person in charge, visit the customer's property, do various kinds of work at the customer's property, and re-visit the customer's property at the time of occurrence of an error.

The remote management system 100 enables a test operation of a control device without causing the person in charge to visit a customer's property. Specifically, when the customer's property is small and operated uniformly, the remote management system 100 can transmit information concerning the initial setting of devices, which is suitable for the type of the property, to the control device from a remote location to automatically perform the test operation of the control device. As a result, the remote management system 100 can significantly reduce the time and man-hours required for the test operation of the control device.

More specifically, in the remote management system 100, a person who has installed the devices 20 and the control terminal 30 in the property 10 does not need to perform software setting work for the test operation of the control terminal 30, and is only required to turn on the power source of the control terminal 30. As a result, the test operation of the control device 30 corresponding to steps S13 to S17 in FIG. 3 is automatically executed. In the test operation of the control device 30, the management apparatus 40 automatically identifies the property 10 in which the devices 20 are installed, and transmits necessary information (property setting information) to the control terminal 30, and the control terminal 30 transmits appropriate initial setting information to the devices 20 in accordance with the information received from the management apparatus 40. As a result, the test operation of the control terminal 30 is automatically completed without causing the person in charge to operate the control terminal 30 and perform software setting work.

If an error occurs for the initial setting of the devices 20 or the like after the completion of the test operation of the control terminal 30, the person in charge can operate the management apparatus 40 to transmit appropriate initial setting information to the devices 20 via the control terminal 30. Accordingly, the person in charge does not need to visit the property 10 even if an error occurs for the initial setting of the devices 20 or the like after the completion of the test operation of the control terminal 30.

The remote management system 100 thus enables the test operation of the control terminal 30, including initial setting work for the devices 20 installed in the property 10, without any visit to the property 10. As a result, the remote management system 100 can significantly reduce the time and man-hours required for the test operation of the control terminal 30 after the installation of the devices 20.

In addition, the remote management system 100 only requires the power source of the control terminal 30 to be turned on after the devices 20 and the control terminal 30 are installed in the property 10 to automatically perform the test operation of the control terminal 30. As a result, a person who has installed the devices 20 and the control terminal 30 in the property 10 does not need to learn in advance the knowledge required to do software setting work for the test operation of the control terminal 30.

Additionally, when performing the test operation of each of the control terminals 30 in a plurality of small and uniform properties 10, the remote management system 100 can automatically identify the corresponding property 10 and perform appropriate test operation of the control terminal 30 in accordance with the type of the property 10. Specifically, the management apparatus 40 stores a plurality of templates for initial setting information of the devices 20 to be used for the test operation of the control terminal 30, and transmits any of the templates that matches the type of the property 10 to the control terminal 30. In the remote management system 100, therefore, there is no need to perform the test operation of the control terminal 30 for each property 10.

Second Embodiment (1) Configuration

A remote management system 200 according to a second embodiment will be described with reference to the drawings. The remote management system 200 according to the second embodiment and the remote management system 100 according to the first embodiment are the same in basic configuration and operation, and differences will mainly be described.

Figure 4:
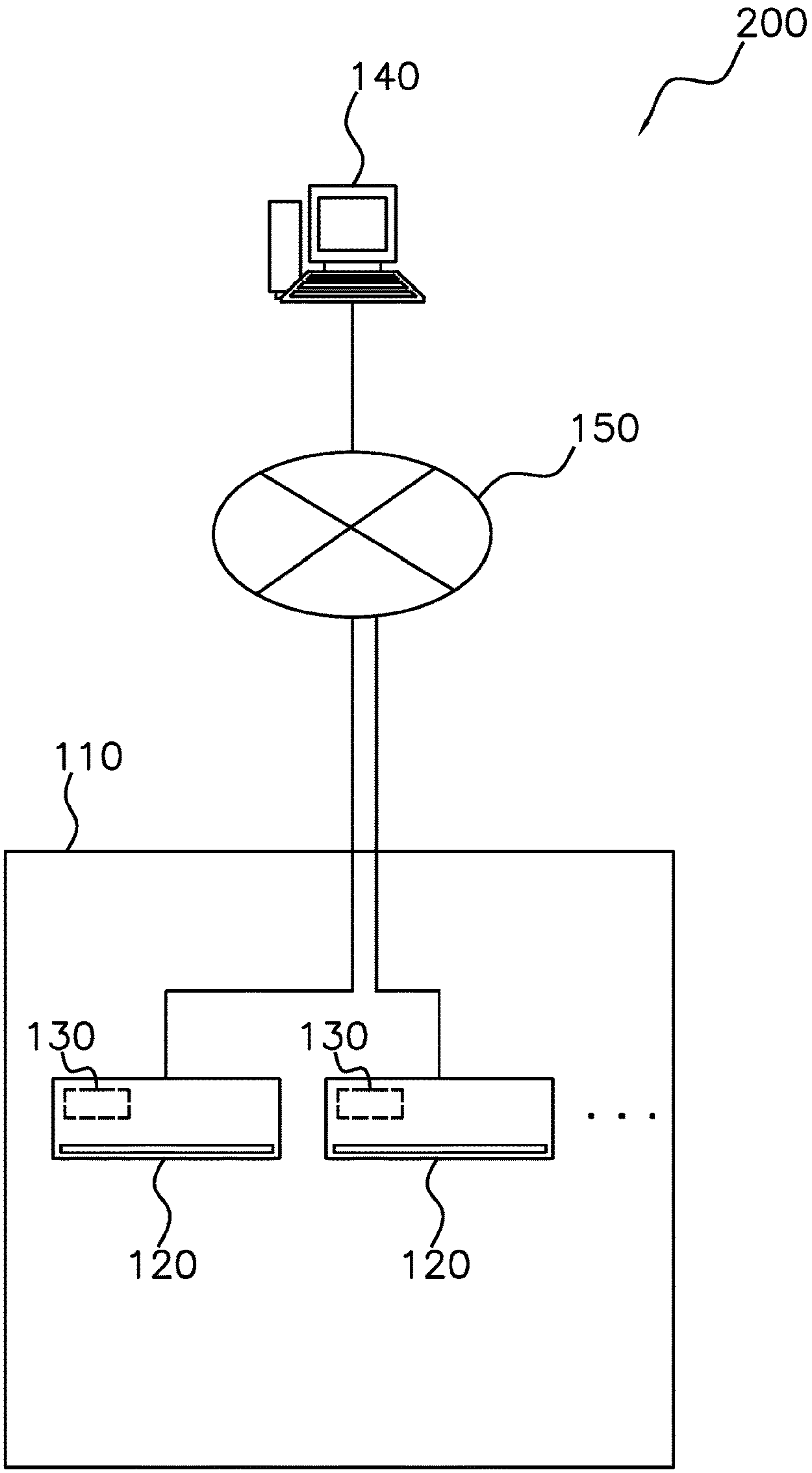
FIG. 4 is a detailed configuration diagram of a remote management system 200 according to a second embodiment.

FIG. 4 is a detailed configuration diagram of the remote management system 200. FIG. 4 illustrates only one property 110 in which a plurality of devices 120 are installed. As illustrated in FIG. 4, the remote management system 200 mainly includes the devices 120, a management apparatus 140, and a network 150. The devices 120 are installed in the property 110. The management apparatus 140 is installed outside the property 110. The management apparatus 140 is an apparatus for remotely managing the devices 120.

The remote management system 200 does not include the control terminal 30, unlike the remote management system 100 according to the first embodiment. Instead, each of the devices 120 has incorporated therein a communication device 130 having the same function as the control terminal 30. The management apparatus 140 and the communication devices 130 incorporated in the devices 120 in each property 110 are capable of communicating with each other via the network 150.

The property 110, the devices 120, the management apparatus 140, and the network 150 in the remote management system 200 have the same basic configuration and operation as the property 10, the devices 20, the management apparatus 40, and the network 50 according to the first embodiment, respectively.

(2) Operation

The remote management system 200 can automatically complete the test operation of the devices 120, which is performed after the devices 120 are installed in the property 110, without causing the person in charge to visit the property 110. In the test operation of each of the devices 120, the device 120 performs initial setting of the device 120 to allow the device 120 to communicate with the management apparatus 140 on the basis of the initial setting information received from the management apparatus 140. In the test operation of the devices 120, initial setting of the devices 120 is performed.

Figure 5:
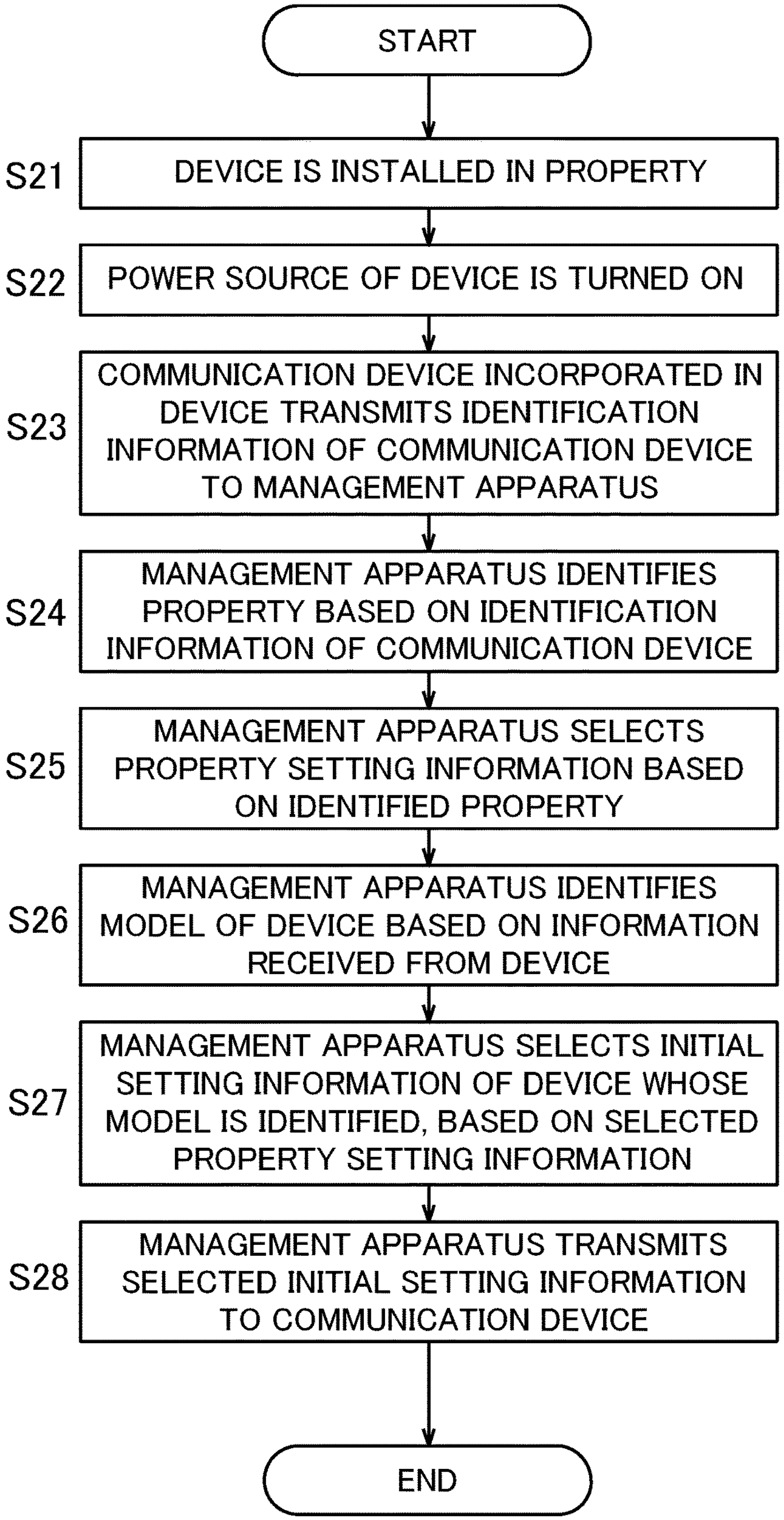
FIG. 5 is a flowchart of a test operation of a device 120 according to the second embodiment.

Next, the details of the test operation of the devices 120, which is performed after the installation of the devices 120, will be described. FIG. 5 is a flowchart of the test operation of each of the devices 120.

First, in step S21, the device 120 is installed in the property 110. In step S21, only physical installation work of hardware is performed, and no software setting is performed.

Then, in step S22, the power source of the device 120 is turned on. Specifically, a person who has installed the device 120 turns on the power source of the device 120 after the completion of the installation work. When this operation is performed, all subsequent steps S23 to S28 are automatically executed, and the test operation of the device 120 is completed.

In step S23, the communication device 130 incorporated in the device 120 whose power source is turned on in step S22 requests the management apparatus 140 to transmit appropriate initial setting information. At this time, after establishing communication with the management apparatus 140, the communication device 130 transmits identification information of the communication device 130 to the management apparatus 140. The identification information of the communication device 130 is a specific ID held by the communication device 130 and is information for uniquely identifying the communication device 130 incorporated in the device 120 installed in each property 110.

In step S24, the management apparatus 140 identifies the property 110 on the basis of the identification information of the communication device 130 received from the communication device 130 in step S23. The management apparatus 140 stores, in advance, information in which identification information of a communication device 130 incorporated in a device 120 installed in each property 110 and the property 110 in which the device 120 is installed are associated with each other. This enables the management apparatus 140 to identify the property 110 in which the device 120 is installed, on the basis of the identification information of the communication device 130.

In step S25, the management apparatus 140 selects property setting information on the basis of the property 110 identified in step S24. The property setting information is information necessary to execute the test operation of the device 120. The property setting information includes initial setting information of the device 120 corresponding to the type of the property 110. The management apparatus 140 stores, for each type of property 110, property setting information in advance.

In step S26, the management apparatus 140 further receives information concerning the model of the device 120 from the communication device 130 incorporating the device 120 and identifies the model of the device 120.

In step S27, the management apparatus 140 selects initial setting information of the device 120 whose model is identified in step S26, on the basis of the property setting information selected in step S25.

In step S28, the management apparatus 140 transmits the initial setting information of the device 120 selected in step S27 to the communication device 130 incorporated in the device 120. After that, initial setting of the device 120 is performed in accordance with the initial setting information received by the communication device 130.

(3) Features

In the remote management system 200, a person who has installed each of the devices 120 in the property 110 does not need to perform software setting work for the test operation of the device 120, and is only required to turn on the power source of the device 120. As a result, the test operation of the device 120 corresponding to steps S23 to S28 in FIG. 5 is automatically executed. In the test operation of each of the devices 120, the management apparatus 140 automatically identifies the property 110 in which the device 120 is installed, and the model of the device 120, and transmits appropriate initial setting information to the device 120. As a result, the test operation of the device 120 is automatically completed without causing the person in charge to operate the device 120 and perform software setting work.

If an error occurs for the initial setting of the device 120 or the like after the completion of the test operation of the device 120, the person in charge can operate the management apparatus 140 to transmit appropriate initial setting information to the device 120. Accordingly, the person in charge does not need to visit the property 110 even if an error occurs for the initial setting of the device 120 or the like after the completion of the test operation of the device 120.

The remote management system 200 thus enables the test operation of the device 120, including initial setting work for the device 120 installed in the property 110, without any visit to the property 110. As a result, the remote management system 200 can significantly reduce the time and man-hours required for the test operation of the device 120 after the installation of the device 120.

In the remote management system 200, furthermore, a person who has installed the device 120 in the property 110 does not need to learn in advance the knowledge required to do software setting work for the test operation of the device 120.

In the remote management system 200, moreover, there is no need to perform the test operation of the control terminals 130 for each property 110.

—Modifications—

(1) Modification A

In the first embodiment, when the test operation of the control terminal 30 is to be performed, the management apparatus 40 transmits property setting information including the initial setting information of the devices 20 to the control terminal 30 on the basis of the identification result of the property 10. However, the management apparatus 40 may determine in advance whether to transmit the property setting information to the control terminal 30 on the basis of the identification result of the property 10. For example, when properties 10 are large or properties 10 are not operated uniformly, it is preferable that the test operation of the control terminal 30 be performed for each of the properties 10. Accordingly, for example, when properties 10 are determined to be small and operated uniformly, the management apparatus 40 may transmit property setting information to the control terminals 30, or, otherwise, notify the person in charge that the test operation of the control terminal 30 needs to be performed for each of the properties 10.

In the second embodiment, when the test operation of each of the devices 120 is to be performed, the management apparatus 140 transmits the initial setting information of the device 120 to the device 120 on the basis of the identification result of the property 110 and the identification result of the model of the device 120. However, the management apparatus 140 may determine in advance whether to transmit the initial setting information of the device 120 to the device 120 on the basis of the identification result of the property 110.

(2) Modification B

The devices 20 according to the first embodiment and the devices 120 according to the second embodiment are air conditioners. However, the devices 20 and 120 are not limited to air conditioners if the devices 20 and 120 are devices which are installed in small and uniformly operated properties 10 and 110 and for which initial setting is required. For example, the devices 20 and 120 may be ventilators and refrigerators.

Alternatively, the devices 20 and 120 may be external sensors used together with air conditioners, ventilators, refrigerators, and the like. In this case, the sensors are, for example, motion sensors that detect the presence of a person in the properties 10 and 110. When the devices 20 and 120 are air conditioners, motion sensors are installed at a plurality of locations in the spaces to be air conditioned in the properties 10 and 110 for energy-saving control or the like.

(3) Modification C

In the second embodiment, in step S24 in FIG. 5, the management apparatus 140 identifies the property 110 to transmit the initial setting information of the devices 120 to the devices 120. However, when the management apparatus 140 is only required to identify the models of the devices 120 to transmit the initial setting information of the devices 120 to the devices 120, such as when there is only one type of property 110, the management apparatus 140 may not necessarily identify the property 110.

(4) Modification D

In the first embodiment, the management apparatus 40 transmits the initial setting information of the devices 20 to the devices 20 via the control terminal 30. However, the management apparatus 40 may directly transmit the initial setting information of the devices 20 to the devices 20 without the intervention of the control terminal 30.

In this case, the management apparatus 40 is directly connected to the devices 20 via the network 50. Furthermore, in step S17 in FIG. 3, the control terminal 30 may transmit information concerning the identified models of the devices 20 to the management apparatus 40, and the management apparatus 40 may transmit appropriate initial setting information to a specific device 20 on the basis of the property setting information and the information received from the control terminal 30.

(5) Modification E

In the first embodiment, the management apparatus 40 may further transmit operation setting information of the devices 20 to the control terminal 30. The operation setting information includes at least one of information concerning the schedule of operating the devices 20, information concerning permission and prohibition of operation of the devices 20, and a parameter related to the operation of the devices 20. For example, when the devices 20 are air conditioners, the parameter related to the operation of the devices 20 is a target temperature of a space to be air conditioned.

Likewise, in the second embodiment, the management apparatus 140 may further transmit operation setting information of the devices 120 to the devices 120.

(6) Modification F

In the second embodiment, the communication devices 130 are incorporated in the devices 120. However, the communication devices 130 may not necessarily be incorporated in the devices 120. For example, the communication devices 130 may be devices externally attachable to the devices 120.

(7) Modification G

In the first embodiment, the management apparatus 40 may further present, for each property 10, property management information including information concerning whether the person in charge needs to visit the property 10. For example, the management apparatus 40 may display data including property management information for each property 10 on a display of the management apparatus 40. FIG. 6 illustrates an example of the property management information displayed on the display of the management apparatus 40.

In the property management information illustrated in FIG. 6, a property ID, a property name, an address, contact information, an SE in charge of test operation, a visit to the site, and initial setting data are displayed for each property 10. The "property ID" is a specific ID of the property 10. The "property name" is a character string representing the type of the property 10. The "address" is information concerning the location of the property 10. The "contact information" is the representative phone number of the property 10. The "SE in charge of test operation" is information concerning the class of a system engineer who is a person in charge of the test operation of the control terminal 30 installed in the property 10. In FIG. 6, persons in charge are classified as junior, middle, and senior according to the years of experience or the like. The "visit to the site" is information concerning whether the person in charge needs to visit the property 10 to perform the test operation of the control terminal 30. The "initial setting data" is information concerning the type of the property 10, which is used by the remote management system 100. The "initial setting data" is input when the person in charge does not need to visit the property 10 to perform the test operation of the control terminal 30, or, in other words, when the "visit to the site" item is set to "unnecessary".

Likewise, in the second embodiment, the management apparatus 140 may present, for each property 110, at least property management information including information concerning whether the person in charge needs to visit the property 110.

CONCLUSION

While embodiments of the present disclosure have been described, it will be understood that the forms and details can be changed in various ways without departing from the spirit and scope of the present disclosure as recited in the claims.

Patent Literature

PTL 1: Japanese Unexamined Patent Application Publication No. 2004-184068

What is claimed is:

1. A remote management apparatus for remotely managing one or more devices, wherein after establishing communication with a communication device that is incorporated in or connected to each of the one or more devices via a network, the remote management apparatus is configured to use information received from the communication device to identify a model of each of the one or more devices and a property in which each of the one or more devices is to be installed;

select initial setting information of each of the one or more devices based on the model of each of the one or more devices and a type of the property identified; and transmit the initial setting information of each of the one or more devices to each of the one or more devices via the communication device.

2. The remote management apparatus according to claim 1, wherein the initial setting information includes at least one of identification information of the device, information concerning an installation location of the device, and information specific to an environment in which the device is to be installed.

3. The remote management apparatus according to claim 1, wherein the remote management apparatus determines, based on the type of the property, whether or not to transmit initial setting information of each of the one or inure devices to each of the one or more devices via the communication device.

4. The remote management apparatus according to claim 1, wherein each of the one or more devices includes at least one of an air conditioner, a ventilator, and a refrigerator.

5. A remote management system for remotely managing one or more devices installed at a property, the remote management system comprising:

a control terminal configured to be connected to each of the one or more devices at the property, the control terminal identifying a model of each of the one or more devices based on first information received from each of the one or more devices; and a management apparatus configured to be connected to the control terminal via a network, the management apparatus being configured to receive second information from the control terminal and use the second information to identify the property in which the device is installed, select initial setting information of each of the one or more devices based on a type of the property identified, and transmit the initial setting information of each of the one or more devices to the control terminal or to each of the one or more devices.

6. The remote management system according to claim 5, wherein the management apparatus determines, based on the type of the property, whether to transmit initial setting information of each of the one or more devices to the control terminal or each of the one or more devices.

7. The remote management system according to claim 5, wherein the initial setting information includes at least one of identification information of the device, information concerning an installation location of the device, and information specific to an environment in which the device is to be installed.

8. The remote management system according to claim 5, wherein each of the one or more devices includes at least one of an air conditioner, a ventilator, and a refrigerator.

9. The remote management system according to claim 5, wherein the management apparatus transmits operation setting information of each of the one or more devices to the control terminal or each of the one or more devices, and the operation setting information includes at least one of information concerning a schedule of operating the device, information concerning permission and prohibition of operation of the device, and a parameter related to operation of the device.

10. The remote management system according to claim 5, wherein the management apparatus presents, for each property, at least information concerning whether a person in charge needs to visit the property.

11. The remote management system according to claim 6, wherein the initial setting information includes at least one of identification information of the device, information concerning an installation location of the device, and information specific to an environment in which the device is to be installed.

12. The remote management system according to claim 5, wherein the control terminal is configured to transmit second information to the management apparatus when the control terminal is initially powered on after installation.

13. The remote management system according to claim 5, wherein the second information includes identification information uniquely identifying the control terminal, and the management apparatus contains stored information in which the identification information is associated with the property in which the control terminal is installed, the management apparatus using the stored information to identify the property in which the device is installed.

14. The remote management system according to claim 5, wherein the management apparatus stores a plurality of templates for initial setting information and selects the initial setting information by selecting any template among the plurality of templates that matches the type of the property.

15. The remote management apparatus according to claim 1, the control device is configured to transmit the information to the management apparatus when the one or more devices are initially powered on after installation.

16. The remote management apparatus according to claim 1, wherein the remote management apparatus contains stored information in which identification information included in the information received from the communication device is associated with the property in which the one or more devices are installed, the identification information uniquely identifying the communication device and the management apparatus using the stored information to identify the property in which the device is installed.

17. The remote management apparatus according to claim 1, wherein the management apparatus stores initial setting information and selects the initial setting information for each of a plurality of types of property in advance.

* * * * *